(12) United States Patent
Beaurepaire et al.

(10) Patent No.: US 10,424,202 B1
(45) Date of Patent: Sep. 24, 2019

(54) PARKING STRATEGY RECOMMENDATION BASED ON PARKING SPACE AVAILABILITY DATA

(71) Applicant: HERE GLOBAL B.V., Eindhoven (NL)

(72) Inventors: Jerome Beaurepaire, Berlin (DE); Olivier Dousse, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/034,178

(22) Filed: Jul. 12, 2018

(51) Int. Cl.
G08G 1/14 (2006.01)
G01C 21/34 (2006.01)
G06F 16/29 (2019.01)

(52) U.S. Cl.
CPC ......... G08G 1/143 (2013.01); G01C 21/3453 (2013.01); G06F 16/29 (2019.01)

(58) Field of Classification Search
CPC ...... G08G 1/143; G06F 16/29; G01C 21/3453
USPC ....................................................... 340/932.2
See application file for complete search history.

(56) References Cited

U.S. PATENT DOCUMENTS

| 8,306,734 | B2 | 11/2012 | Mathews |
| 9,870,707 | B2 | 1/2018 | Korman |
| 2008/0033640 | A1* | 2/2008 | Amano ............ G01C 21/3476 701/414 |
| 2008/0048885 | A1* | 2/2008 | Quinn .................. G08G 1/143 340/932.2 |
| 2010/0052946 | A1* | 3/2010 | Levine ................. G08G 1/143 340/932.2 |
| 2012/0056758 | A1* | 3/2012 | Kuhlman ............... G08G 1/14 340/932.2 |
| 2016/0025503 | A1* | 1/2016 | Kees ..................... G08G 1/144 701/400 |

(Continued)

FOREIGN PATENT DOCUMENTS

WO 2016148560 A1 9/2016

OTHER PUBLICATIONS

Martens et al., "Chapter 7, The Dilemma of On-street Parking Policy: Exploring Cruising for Parking Using an Agentbased Model", GeoJournal Library 99, Geospatial Analysis and Modeling of Urban Structure and Dynamics, 2010, pp. 121-138.

(Continued)

*Primary Examiner* — Emily C Terrell
(74) *Attorney, Agent, or Firm* — Ditthavong & Steiner, P.C.

(57) ABSTRACT

A method, apparatus, and computer program product are provided in accordance with an example embodiment described herein for providing a recommendation for a parking strategy. A method may be provided for providing the recommendation for a parking strategy for a vehicle in vicinity of a link that includes: determining an availability metric for the link; determining a turnover metric of vehicles in the link; calculating, by a processor, a strategy metric based on a function of at least the availability metric and the turnover metric, for identifying a strategy for providing parking related recommendation, and providing data for indicating the identified strategy for parking to a user interface. The data for indication may include data for indicating a route for the vehicle on the user interface to navigate to a favorable parking spot in the vicinity of the link, in accordance with the identified strategy for parking.

20 Claims, 12 Drawing Sheets

(56) References Cited

U.S. PATENT DOCUMENTS

| | | | |
|---|---|---|---|
| 2016/0111004 A1* | 4/2016 | Delmas | G08G 1/147 340/932.2 |
| 2016/0155276 A1* | 6/2016 | Ho | G08G 1/146 705/13 |
| 2017/0191849 A1* | 7/2017 | Agam | G01C 21/3685 |

OTHER PUBLICATIONS

Dumound, "Berea downtown parking study finds sufficient spaces available", Blog, Nov. 21, 2012, retrieved from https://www.cleveland.com/berea/index.ssf/2012/11/berea_downtown_parking_study_f.html, pp. 1-9.

* cited by examiner

US 10,424,202 B1

PARKING STRATEGY RECOMMENDATION BASED ON PARKING SPACE AVAILABILITY DATA

TECHNOLOGICAL FIELD

An example embodiment of the present invention relates to providing recommendations about parking space availability for on-street parking, and more particularly, to providing a representation of favorable parking spaces on a map based navigation system for use in vehicles, and providing route guidance to a favorable on-street parking spot based on the recommendations.

BACKGROUND

Urban street spaces are increasingly becoming more congested and a source of stress for commuters driving through or looking for parking spots within the street spaces. A user looking to park a vehicle in a street spends a considerable amount of time cruising through the street, trying to identify a favorable parking spot. The situation is even worse in streets that are in vicinity of public places such as malls, markets, event venues and the like. In such places, the user may have to take multiple rounds of the same street to identify the suitable parking spot, leading to wastage of vehicle miles and also becoming a source of increased pollution. Not only streets, even multi-floor parking garages may pose the same challenge while the user tries to find a parking spot on one of the floors. Navigation assistance systems have been developed to provide users with useful and relevant information regarding occupancy of parking spaces in a street and route guidance to reach available parking spots. These systems may use data stored in a database, such as a database associated with a mapping platform for providing on-street parking assistance.

Providing on-street parking assistance through the use of a map-based navigation system may include providing an indication of parking availability at suitable on-street parking spots with the aim of reducing the amount of cruising required for finding the suitable on-street parking spot. The indication of suitable parking spots may be obtained by performing a comparative analysis of various factors such as availability of parking spaces, distance of indicated parking spot from the user's final destination, ease of access of the parking spot and the like. These parking assistance systems generally provide indications of the free parking spots on an interface of the map-based navigation system. There exists a need for advanced parking assistance systems which can also take other factors into account.

BRIEF SUMMARY

A method, apparatus, and computer program product are provided in accordance with an example embodiment described herein for providing different metrics for identifying a suitable parking strategy recommendation for a vehicle in one example. The example embodiment described herein may also provide for big data analysis capabilities for providing different recommendations based on real-time changes in the parking data and historical street data updates and recommend the best strategy for parking accordingly.

A method, apparatus, and computer program product are provided in accordance with an example embodiment described herein for providing a recommendation for a parking strategy. The recommendation may be provided on the basis of determination of an availability status of a link and a turnover value for the link. The link may include a section of a roadway, a street, a highway segment, a pedestrian pathway, a floor in a parking garage or any other area which may include a provision for parking vehicles, either on or in the vicinity of the link. In some example embodiments, the recommendation may be provided using a navigation system installed in a vehicle. The navigation system may include a user interface, in the form of a display, for providing an indication of the recommendation provided to the user.

In some example embodiments, a method may be provided for providing parking related recommendation for a vehicle in vicinity of the link. The method may include: determining an availability metric for the link; determining a turnover metric of vehicles in the link; calculating, by a processor, a strategy metric based on a function of at least the availability metric and the turnover metric, for identifying a strategy for providing a parking related recommendation; and providing data for indicating the identified strategy for parking to a user interface.

In some example embodiments, the method may further include providing route navigation assistance for the vehicle to navigate to a favored parking spot based on the identified strategy for parking.

According to some embodiments, the method for providing parking related recommendation may further include providing data to the user interface for indicating to the vehicle to stop and wait for a favorable parking spot. In some other example embodiments, the method may include providing data to the user interface for indicating to the vehicle to continue moving forward on the link to explore a favorable parking spot. In yet another embodiment, the method may include providing data to the user interface for indicating to the vehicle to change their route of navigation to a second link for exploring the favorable parking spot.

In some example embodiments, the method for providing parking related recommendation may further include: determining a time required for navigating through the link; calculating, by the processor, a time required for searching for a suitable parking spot based on a ratio between the availability metric and the turnover metric and time required for navigating through the link; and identifying a strategy for parking based on time required for searching for a suitable parking spot.

Embodiments disclosed herein may provide an apparatus comprising at least one non-transitory memory including computer program code instructions. The computer program code instructions, when executed, may cause the apparatus to at least: determine an availability metric for the link; determine a turnover metric of vehicles in the link; identify a strategy for parking based on a strategy metric, wherein the strategy metric is based on a function of at least the availability metric and the turnover metric, for providing parking related recommendation; and provide data for indicating the identified strategy for parking to a vehicle. The data for indicating the identified strategy for parking may include data for indicating at least one favorable parking spot on the link and data for indicating a route for navigating to the at least one favorable parking spot on the link.

According to some example embodiments, the apparatus may optionally be caused to provide data for indicating to the vehicle to stop and wait if a value of the strategy metric is higher than a first predetermined threshold value. In some example embodiments, the apparatus may optionally be caused to provide data for indicating to the vehicle to continue moving forward on the link if a value of the strategy metric is higher than a second predetermined threshold value. In yet other example embodiments, the apparatus may optionally be caused to provide data for to the vehicle to change a route of navigation to a second link if a value of the strategy metric is higher than a third predetermined threshold value.

In some example embodiments, the apparatus including at least one non-transitory memory including computer program code instructions may include computer code instructions that when executed may be further caused to: calculate a ratio between the availability metric and the turnover metric; determine a time required for navigating through the link; calculate a time required for searching for a suitable parking spot based on the calculated ratio between the availability metric and the turnover metric and the time required for navigating through the link; and identify a strategy for parking based on the time required for searching for the suitable parking spot.

In some example embodiments, the apparatus may be further caused to identify a distance of the suitable parking spot from a final destination of the vehicle.

A computer program product may be provided including at least one non-transitory computer-readable storage medium having computer-executable program code instructions stored therein. The computer-executable program code instructions may include program code instructions to: determine an availability metric for a link; determine a turnover metric of vehicles in the link; identify a strategy for parking based on a strategy metric, wherein the strategy metric is based on a function of at least the availability metric and the turnover metric, for providing parking related recommendation. The computer program product may further include program code instructions to display a route for navigation based on the identified strategy for parking.

BRIEF DESCRIPTION OF THE DRAWINGS

Figure 1:
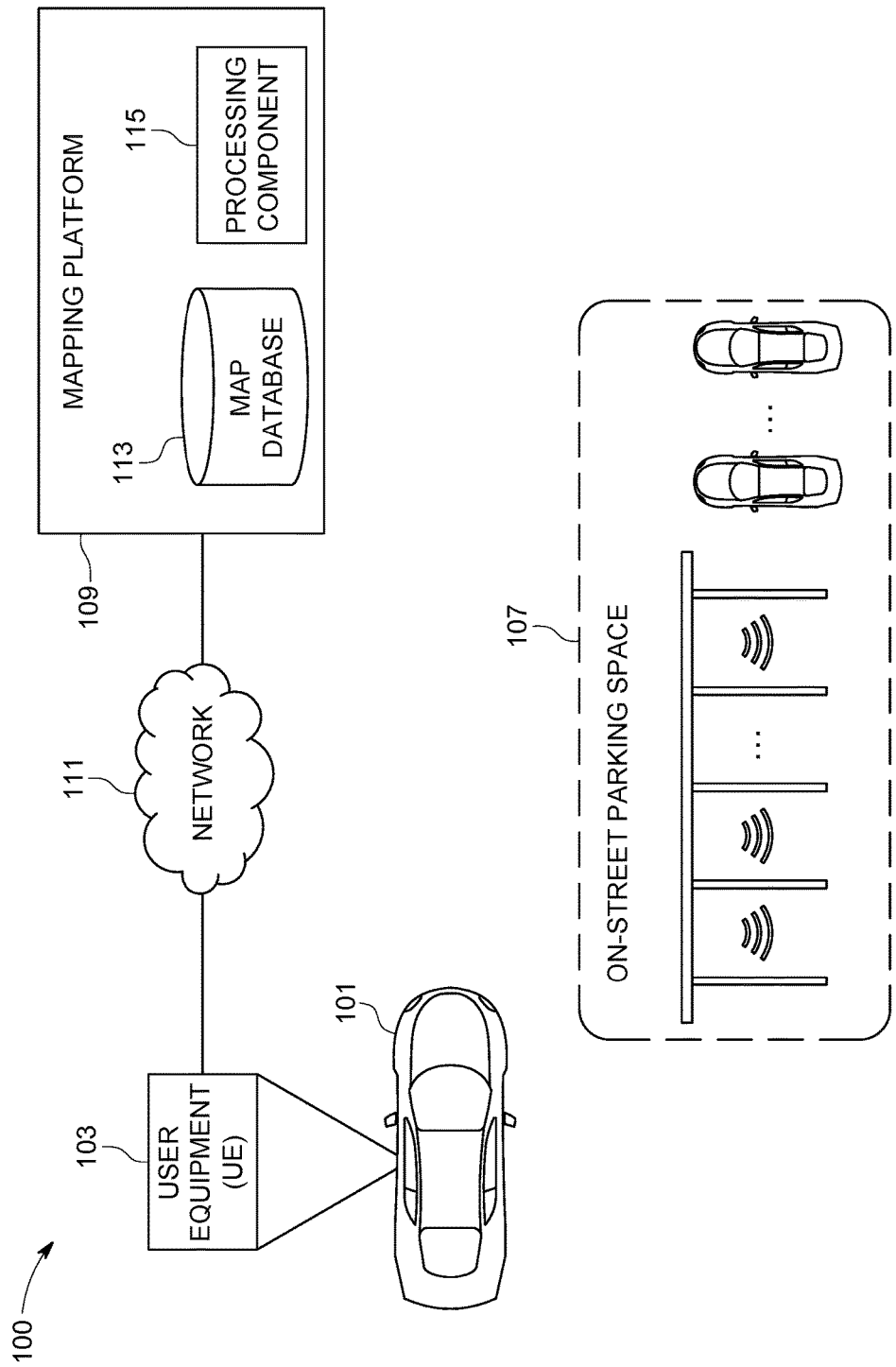
Figure 2:
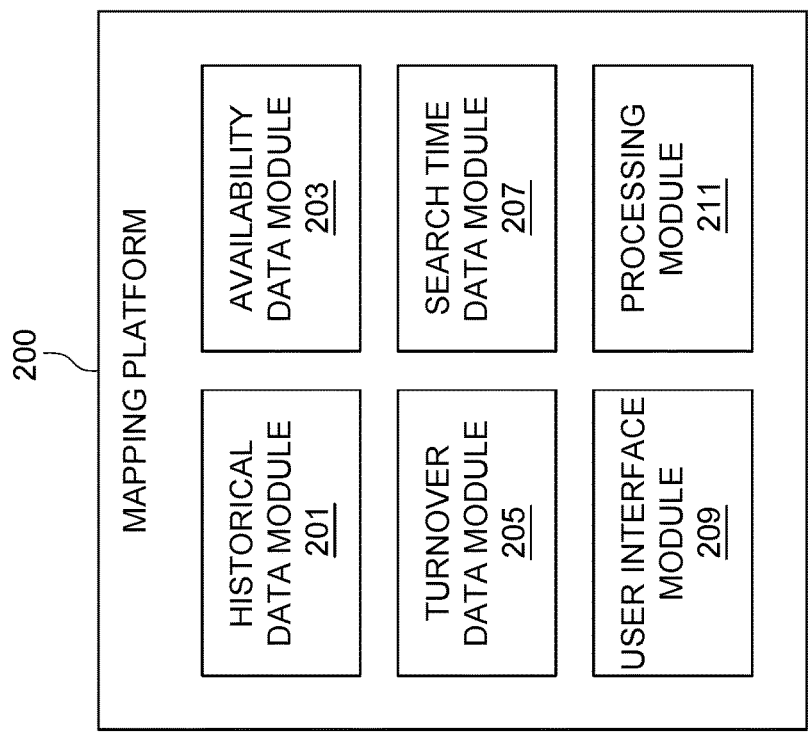
Figure 3:
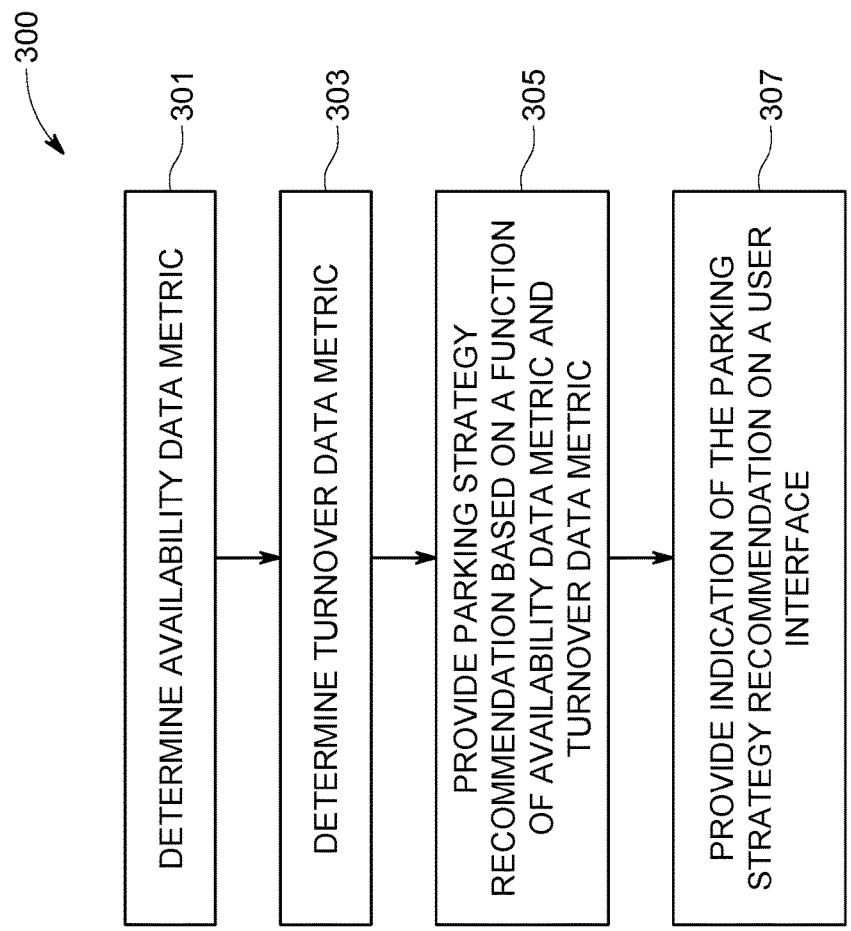
Figure 4:
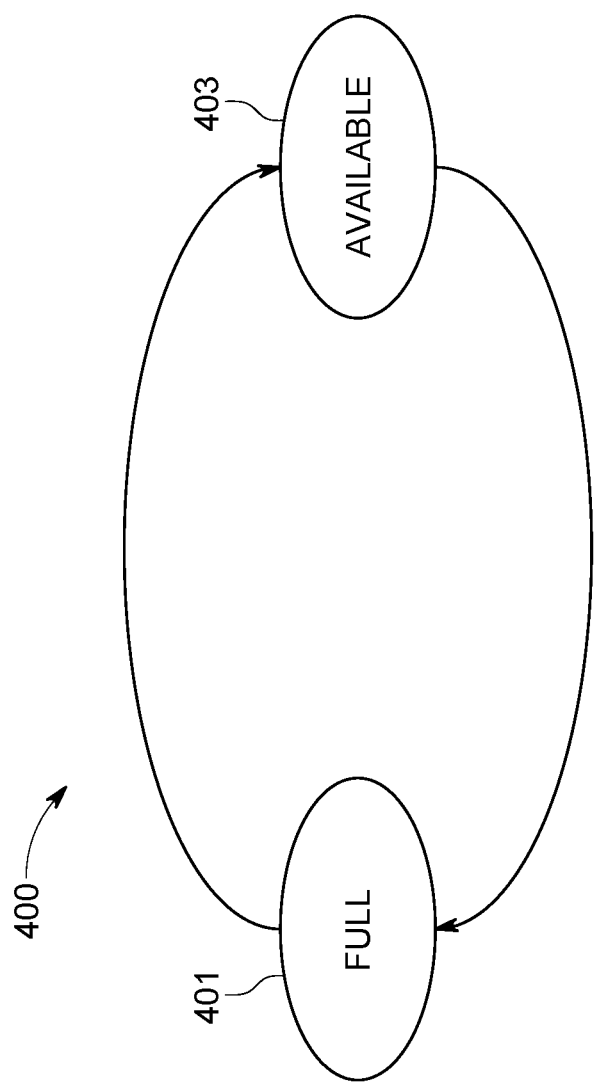
Figure 5A:
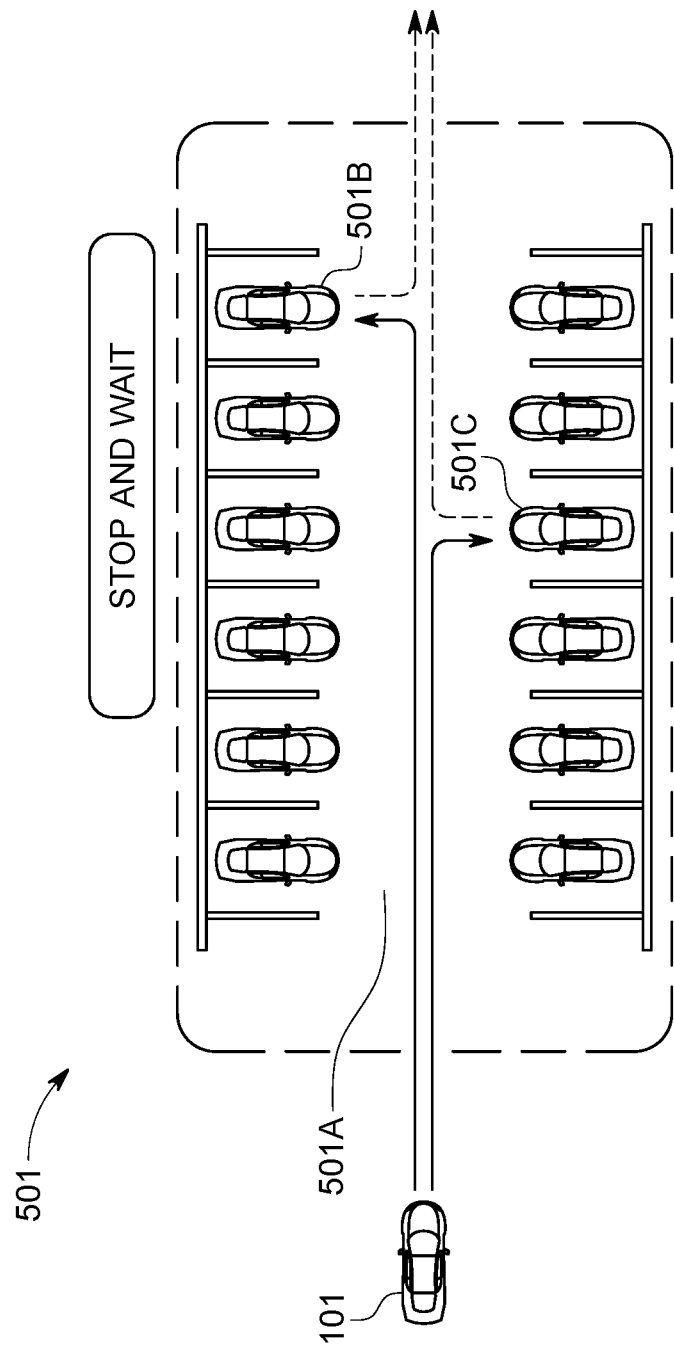
Figure 5B:
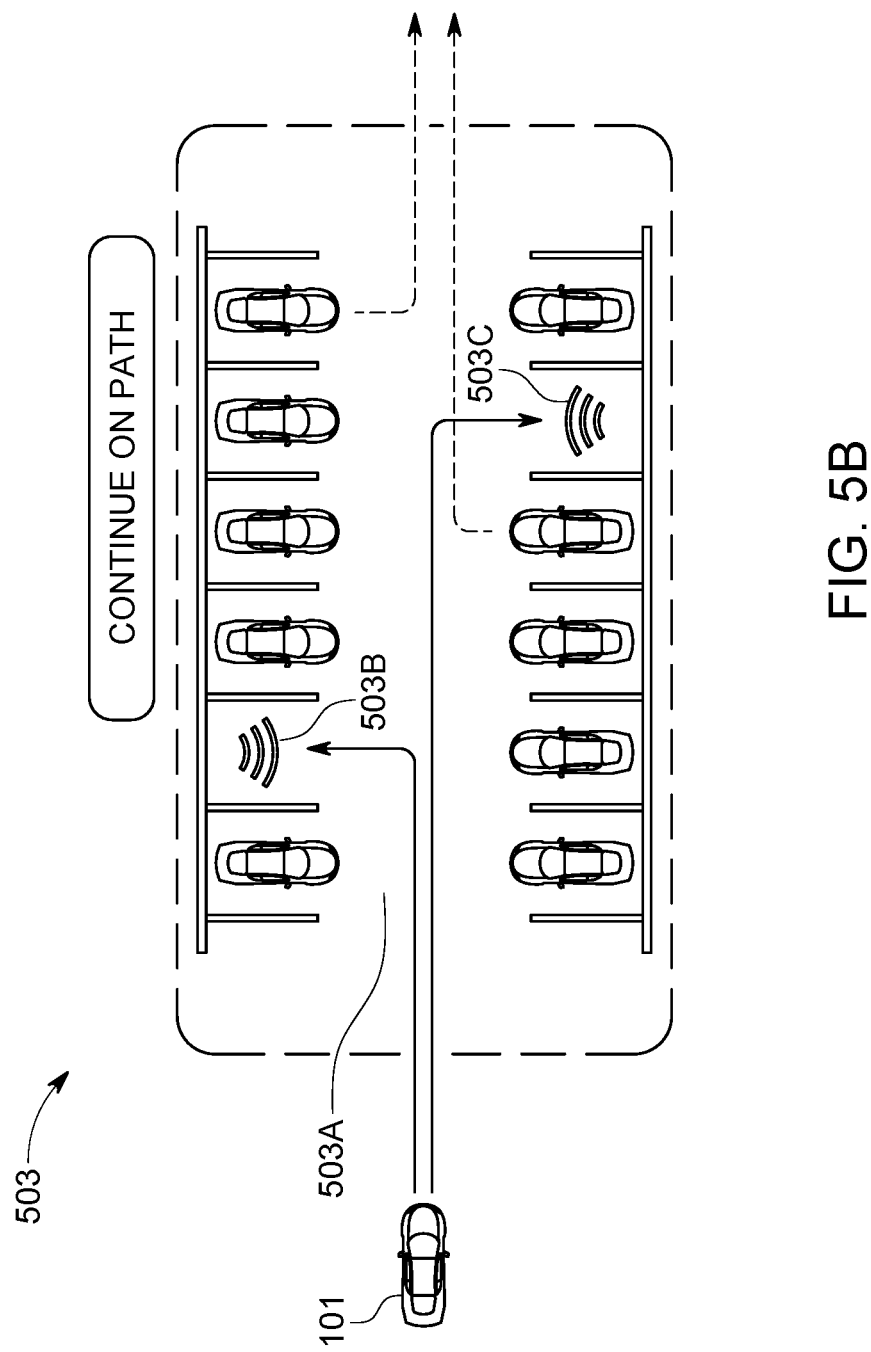
Figure 5C:
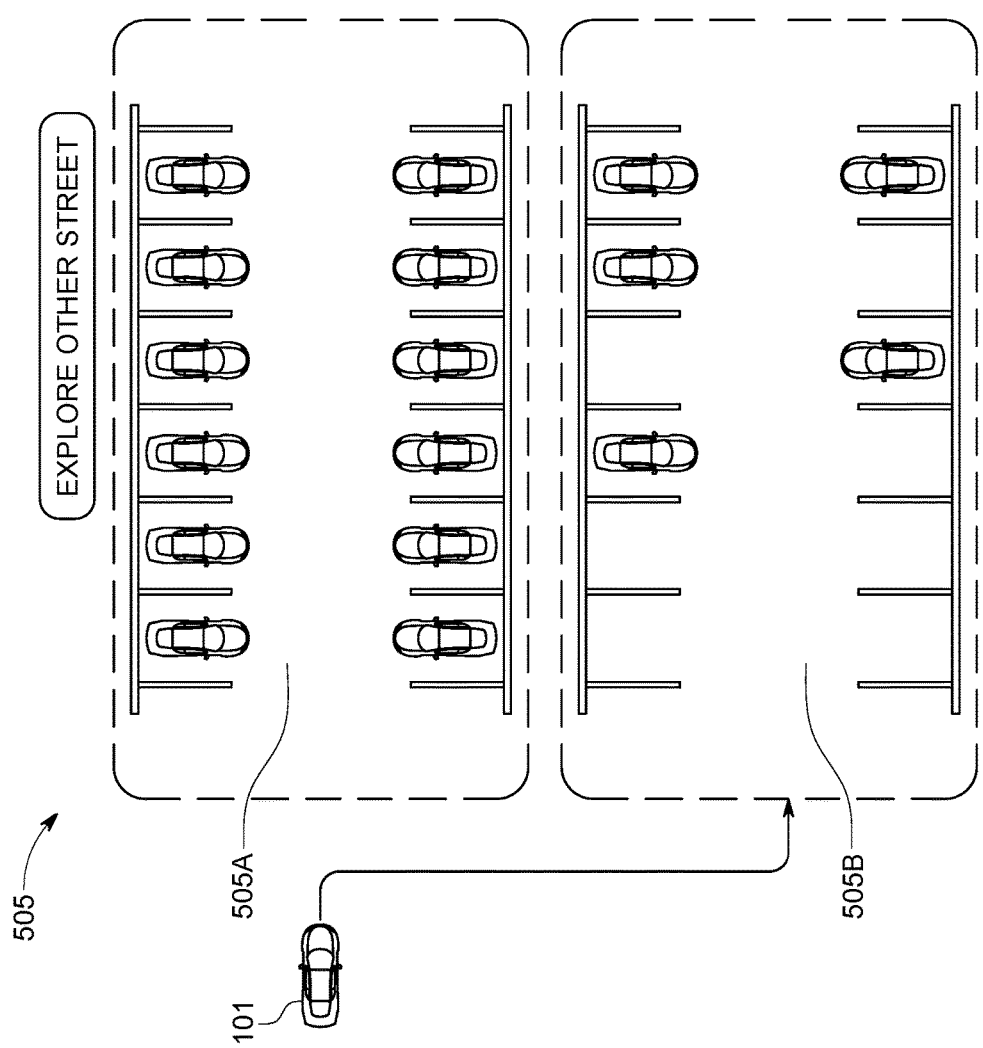
Figure 6A:
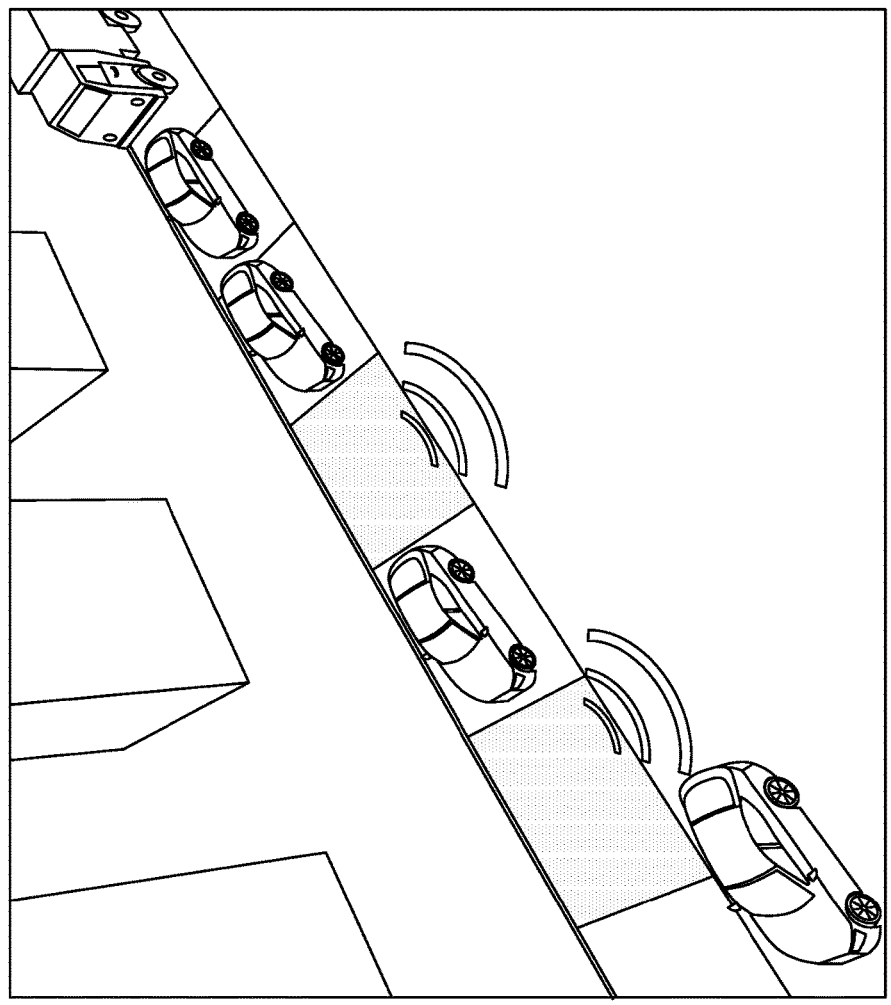
Figure 6B:
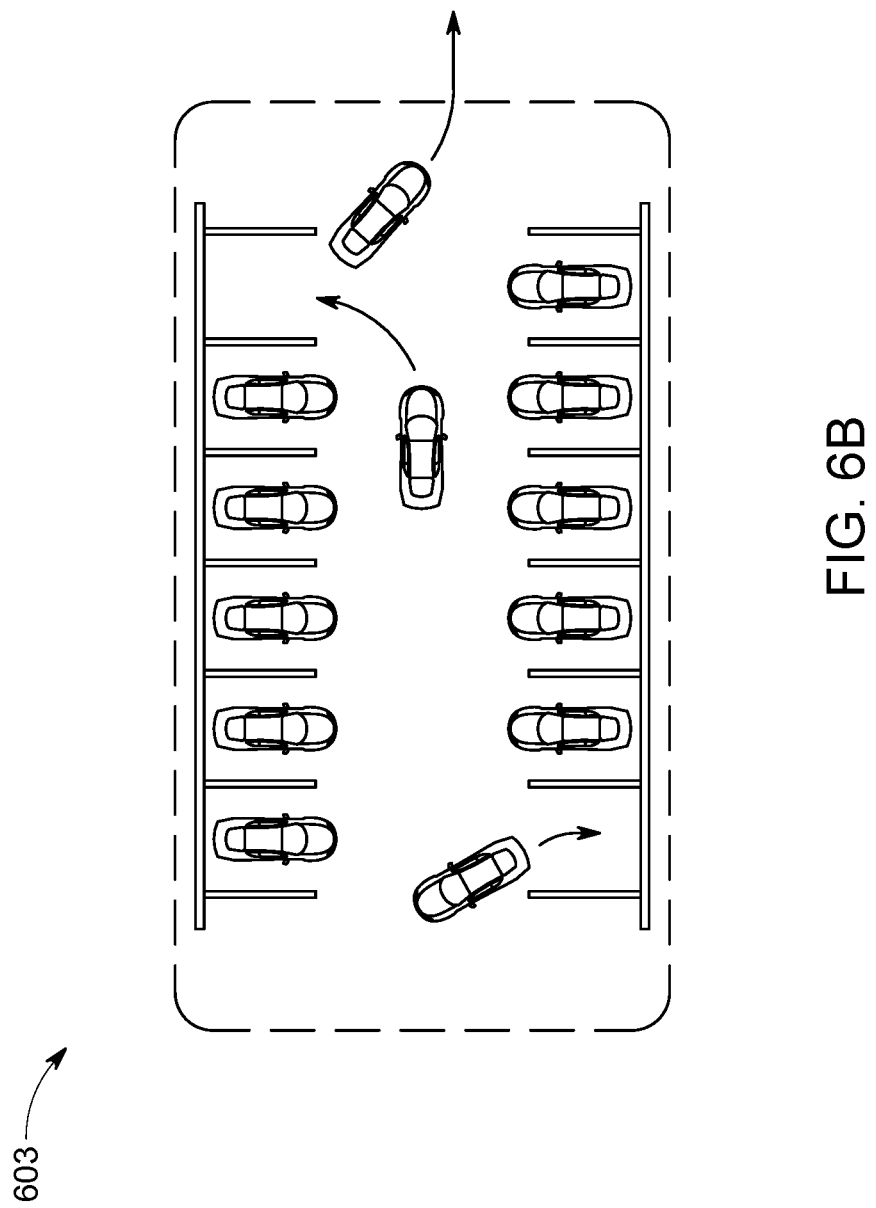
Figure 7A:
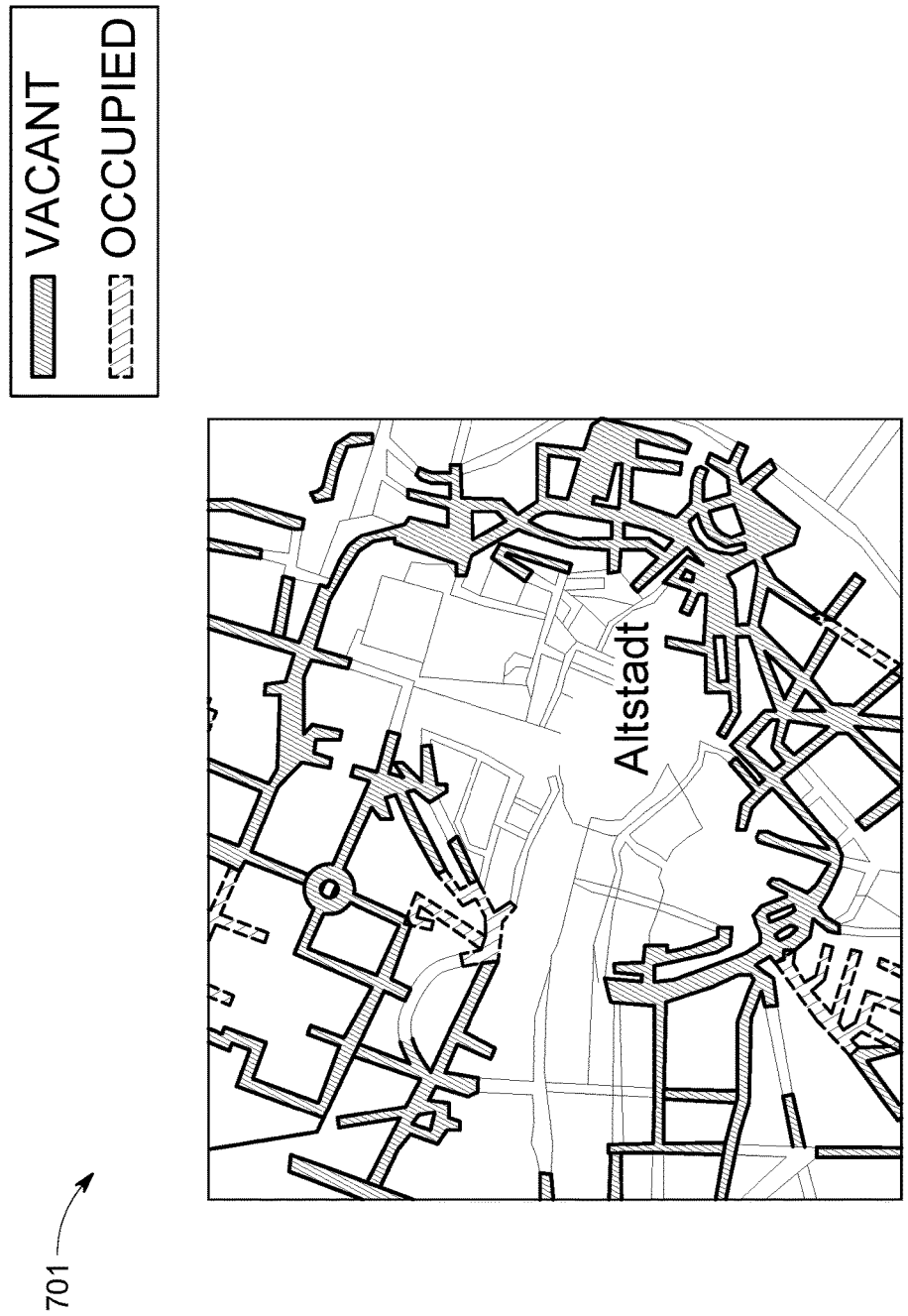
Figure 7B:
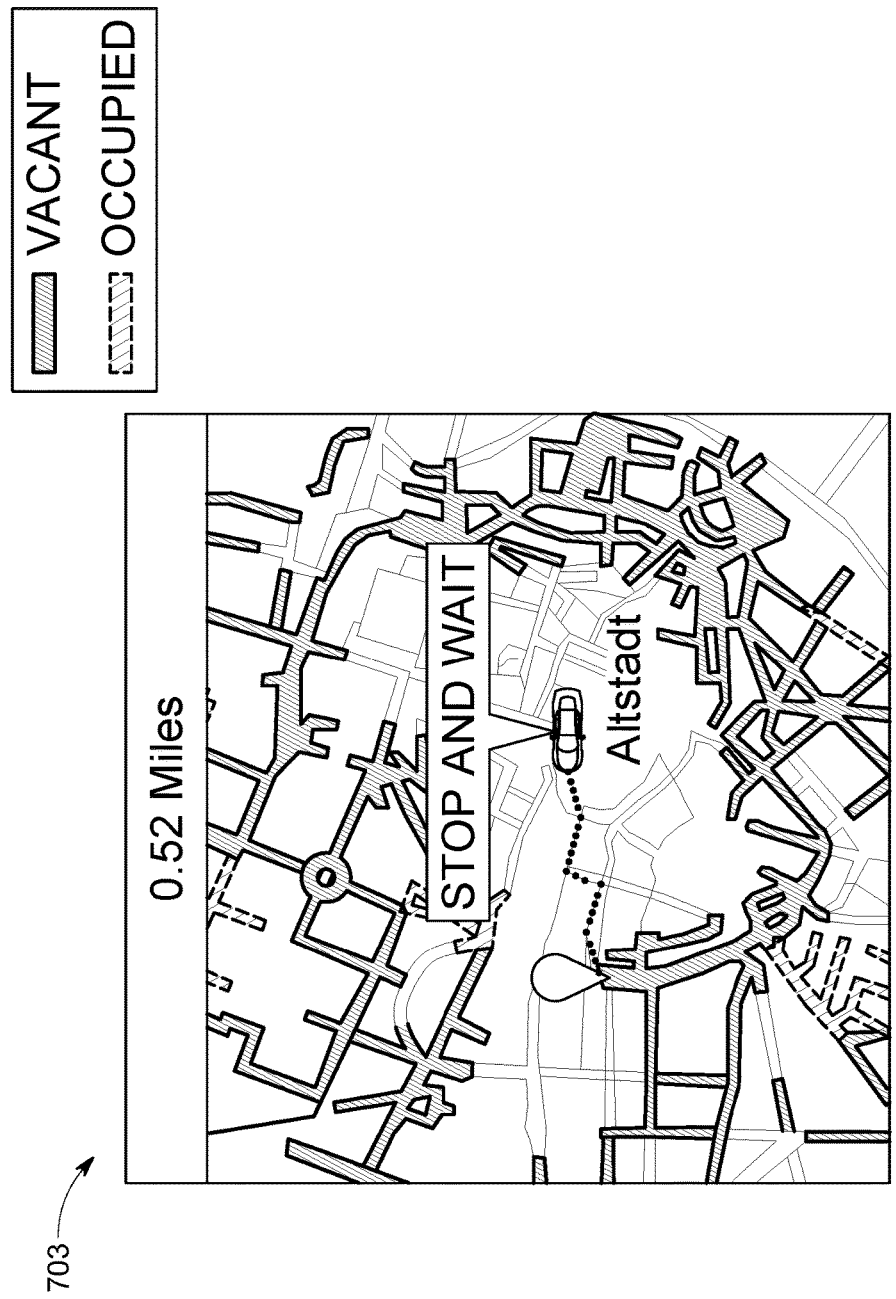
Figure 7C:
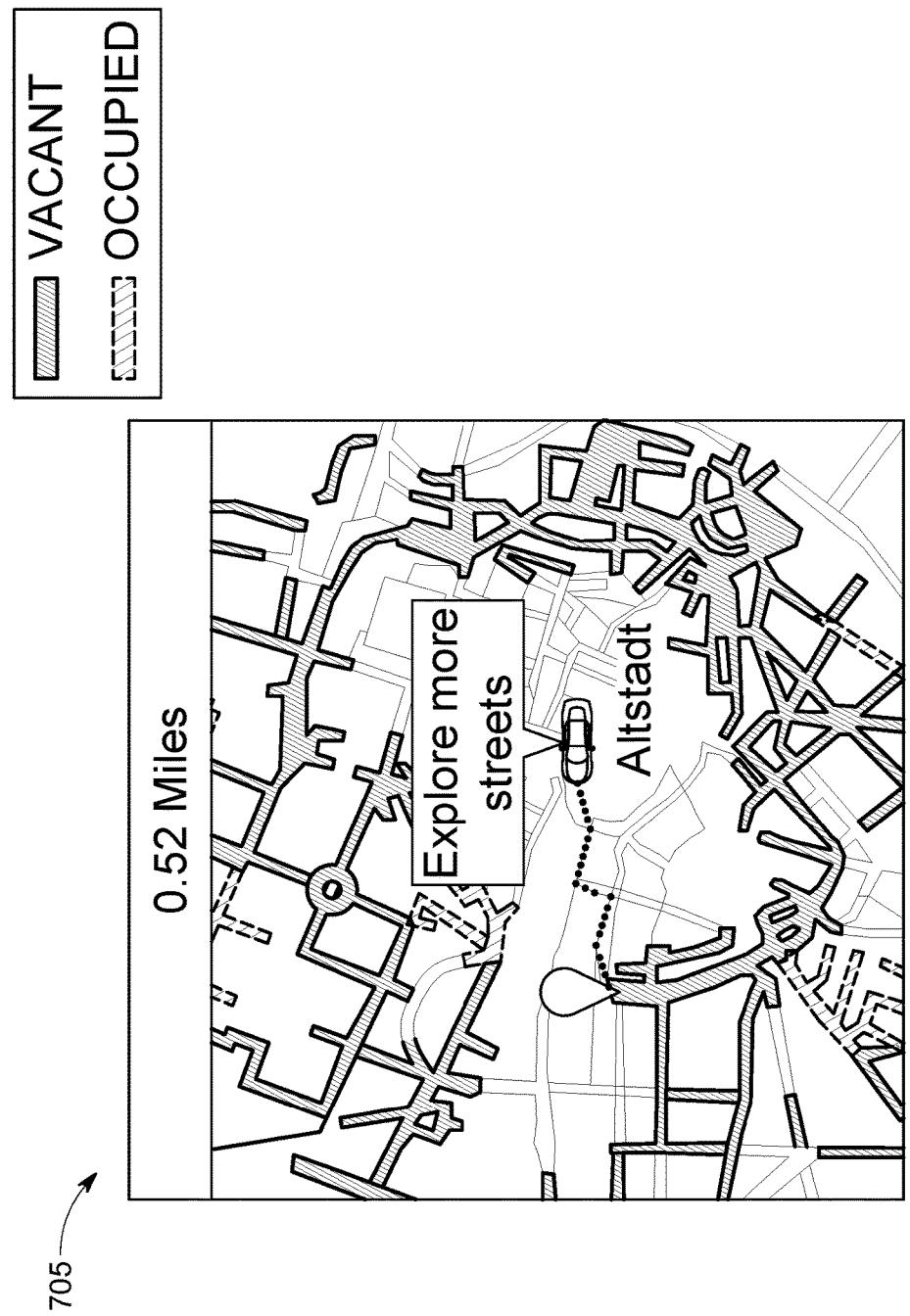

Having thus described example embodiments of the invention in general terms, reference will now be made to the accompanying drawings, which are not necessarily drawn to scale, and wherein:

FIG. 1 illustrates a diagram of a system for providing parking strategy recommendation in accordance with an example embodiment;

FIG. 2 illustrates a block diagram of a platform that may be used for providing data for providing parking strategy recommendation in accordance with an example embodiment;

FIG. 3 illustrates a flow diagram of a method for providing parking strategy recommendation according to an example embodiment;

FIG. 4 illustrates a diagram of a mathematical computational model used for providing an algorithm for identifying a strategy for providing parking recommendation based on a state of a link, according to an example embodiment;

FIGS. 5A-5C illustrate three exemplary scenarios for providing parking strategy recommendation based on the values of different metrics according to example embodiments;

FIGS. 6A-6B illustrate two exemplary techniques for collecting data for determining turnover of a link according to an example embodiment;

FIGS. 7A-7C illustrate the user interface for providing indication of favored parking spots based on parking strategy recommendations according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for providing parking strategy related recommendation for a vehicle in vicinity of a link. The link may include a pathway, a street, a road segment, a highway segment, a resident area segment, a floor of a parking garage and the like. The parking strategy related recommendation may be provided on a user interface, such as the display of a navigation system. The display of the navigation system may include a map based interface for indicating the parking strategy related recommendation. The parking strategy related recommendation may be based on at least an availability metric for the link and a turnover metric for the link, which may be used to calculate a strategy metric for identifying a strategy for providing the parking strategy related recommendation. Embodiments disclosed herein may further provide an indication of a route for navigating to a favored parking spot identified on the basis of the parking strategy related recommendation. The route for navigation may be displayed on the user interface of the navigation system, such as on the display of the map based interface of the navigation system.

Parking related assistance may also be provided in navigation systems already available in the art. However, such navigation systems may offer limited indications of parking facilities that may be available in the vicinity of the user's location, which may be identified by the navigation system. These systems fail to indicate a strategy for parking to a favorable spot within the parking facilities based on analysis of one or more metrics such as the availability metric and the turnover metric. Moreover, such systems cannot indicate a favorable parking spot when the user is in vicinity of a link, which may not be a parking facility, such as an on-street road segment where the user can park their vehicle or on a floor of a parking garage. In such a situation, the user may waste a considerable amount of time and vehicle miles, while looking for a suitable parking spot. Sometimes, the user may have to encircle the same street multiple times, or travel up and down the various floors of the parking garage to explore if a parking spot became available. This may be very frustrating for the user driving the vehicle. The situation may be even worse in locations or links that are near public places, such as malls, cinemas, markets, entertainment hubs, event venues and the like. The links in vicinity of such public places may have jam-packed parking most of the times, and the user may find it challenging to identify a suitable parking spot for parking their vehicle in these locations. However, these locations may also have frequent park-in and park-out events of vehicles. For example, some users may stop by a market for a brief errand, and park their vehicle on an on-street link in vicinity of the market. However, this parking stopover may be very brief and the user may quickly return and leave, making the spot free again. However, if another user came looking for a vacant parking spot within the brief duration while the first user had parked the vehicle they may leave the street and travel to a different street looking for a vacant spot there. If they are unable to find a spot on the next street, they may return to the same street and find a vacant spot now and park their vehicle. However, in the process the user may waste fuel and time while navigating through the same street twice. Thus, it may be desirable to provide an improved parking recommendation system to users of vehicles, specifically for parking in a link such as an on-street parking link that may provide a suitable strategy for parking to the user based on analysis of various metrics associated with the link, such as park-in and park-out events occurring in the link. Moreover, it would be further advantageous if these various metrics could be gathered, analyzed and updated in real-time, based on advanced sensing and analytical processing technologies.

To provide a way to indicate the favored parking spot to a user of a vehicle in the vicinity of a link based on a parking recommendation that takes into account various metrics associated with the link, a system as illustrated in FIG. 1 may be provided. The system of FIG. 1 may facilitate navigation and route guidance for the vehicle from the vehicle's current location to a favored parking spot based on a strategy for parking that may be identified based on some metrics associated with link, and using the strategy to provide a recommendation to the user to navigate to the favored parking spot.

FIG. 1 illustrates a diagram of a system 100 for providing parking strategy recommendation for implementing example embodiments described herein. The illustrated embodiment of the system 100 includes a vehicle 101, which may be driven by a user. The vehicle 101 may be in vicinity of a link 107, which may be a parking space. The vehicle 101 may be equipped with a user equipment (UE) 103, which may be in communication with a mapping platform 109, over a network 111. The network 111 may be wired, wireless, or any combination of wired and wireless communication networks, such as cellular, Wi-Fi, internet, local area networks, or the like.

The user equipment 103 may be a navigation system, such as an advanced driver assistance system (ADAS), that may be configured to provide route guidance and navigation related functions to the user of the vehicle 101. The user equipment 103 may also be configured to provide parking related recommendation to for the vehicle in accordance with the example embodiments disclosed herein.

The parking space of the link 107 may comprise a road link, a street, a floor of a parking garage, an area designated for parking, a road outside a public place such as: a mall, a sporting event venue, a market and the like.

The user equipment 103 may include a mobile computing device such as a laptop computer, tablet computer, mobile phone, smart phone, navigation unit, personal data assistant, watch, camera, or the like. Additionally or alternatively, the user equipment 103 may be a fixed computing device, such as a personal computer, computer workstation, kiosk, office terminal computer or system, or the like. The user equipment 103 may be configured to access the mapping platform 109 via a processing component 115 through, for example, a mapping application, such that the user equipment 103 may provide navigational assistance to a user of the vehicle 101 among other services provided through access to the mapping platform 109.

The mapping platform 109 may include a map database 113, which may include node data, road segment data or link data, point of interest (POI) data, or the like. The map database 113 may also include cartographic data, routing data, and/or maneuvering data. According to some example embodiments, the road segment data records may be links or segments representing roads, streets, floors, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 113 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 113 can include data about the POIs and their respective locations in the POI records. The map database 113 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 113 can include event data (e.g., traffic incidents, construction activities, scheduled events, unscheduled events, etc.) associated with the POI data records or other records of the map database 113 associated with the mapping platform 109.

The mapping platform 109 may be maintained by a content provider e.g., a map developer. By way of example, the map developer can collect geographic data to generate and enhance mapping platform 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 113 of the mapping platform 109 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 103, for example. Further, data may be compiled relating to parking space availability, movement of vehicles within parking spaces between different data compilation events and the like along different road segments of the map database 113, where a parking availability estimation may be generated in dependence of time of day, day of week, season of the year, special events, etc. The navigation-related functions can correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 109 may be a master geographic database configured at a server side, but in alternate embodiments, a client side mapping platform 109 may represent a compiled navigation database that may be used in or with end user devices (e.g., user equipment 103) to provide navigation and/or map-related functions. For example, the mapping platform 109 may be used with the end user device 103 to provide an end user with navigation features. In such a case, the mapping platform 109 can be downloaded or stored on the end user device (user equipment 103) which can access the mapping platform 109 through a wireless or wired connection, over the network 111. This may be of particular benefit when used for navigating within spaces that may not have provisions for network connectivity or may have poor network connectivity, such as an indoor parking facility, a multi-floor parking garage, a remote street near a residential area and the like. As many parking facilities are multi-level concrete and steel structures, network connectivity and global positioning satellite availability may be low or non-existent. In such cases, locally-stored data of the mapping platform 109 regarding the parking spaces may be beneficial as identification of suitable parking spot in the parking space could be performed without requiring connection to a network or a positioning system. In such an embodiment, various other positioning methods could be used to provide vehicle reference position within the parking facility, such as inertial measuring units, vehicle wheel sensors, compass, radio positioning means, etc.

In one embodiment, the end user device or user equipment 103 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 103 for navigation and map functions such as guidance and map display, for example, and for determination of one or more personalized routes or route segments, identifying favorable parking spaces based on one or more calculated and recorded routes, according to some example embodiments. The user equipment 103 may include an application that may enable the user to access the mapping platform 109 for availing the functions disclosed above.

FIG. 2 illustrates a block diagram of the mapping platform 200 (for example, like the mapping platform 109) that may be used to provide a parking strategy recommendation in accordance with an example embodiment. In the embodiments described herein, the mapping platform 200 may be a cloud based platform that may be configured to provide data for retrieving various metrics for providing parking related recommendations. The data related to various metrics may be computed periodically using real-time sensor data from various locations or POIs. The data may then be transmitted to the mapping platform 200 that may categorize the data corresponding to different metrics and store the data in different modules for access by a plurality of navigation related services, such as the parking recommendation navigation system disclosed herein.

The data in the mapping platform 200 may be stored in different categorical modules including a historical data module 201, an availability data module 203, a turnover data module 205, and a search time data module 207. The mapping platform 200 may further include a user interface module 209 which may be used in some examples for directly accessing the data of the different categorical modules of the mapping platform 200, such as for statistical, analytical or developmental purposes. The mapping platform 200 may also be used to provide computations of various metrics using a processing module 211.

The historical data module 201 may include data about various locations, parking spaces at various locations, geographical data related to parking regions, navigation route maps for different regions, sensor data related to occupancy of parking spaces collected from various locations, parking timings related data for different locations, parking zone restriction related data, parking availability index corresponding to a plurality of locations, analytical estimates on average-time-to-park for different regions, statistical data previously computed related to performance and accuracy of parking recommendations provided previously and the like. The historical data module 201 may enable access of performance and statistical data on parking recommendation systems. In some embodiments, the historical data module 201 may also include data related to one or more software code libraries, APIs, web services support and other programming related support data for enabling developers of navigation services to develop parking related recommendation system solutions in accordance with the embodiments disclosed herein.

In some embodiments, the data stored in the historical data module 201 may include large volumes of data that may be processed for providing big data analytics capabilities to users of the parking strategy recommendation system disclosed herein. The historical data may be processed in combination with data from other modules of the mapping platform 200 to provide big data based solutions which provide greater accuracy, reliability and foresight for providing real-time location based solutions in navigation systems, such as the user equipment 103 providing parking strategy recommendation in accordance with the embodiments disclosed herein.

The other modules of the mapping platform 200 may include the availability data module 203 that may provide data related to availability status and availability metric for a link, such as an on-street parking pathway, a floor of a parking garage and the like, in vicinity of the vehicle 101. In some embodiments, the availability metric may be computed on the basis of an instantaneous probability of finding a free spot for parking in the link.

In some embodiments, the availability metric may be used to provide availability status information of a parking location of interest of the user of the vehicle 101. The parking location of interest may be identified on the basis of a current location of the user and a direction of travel of the user. The availability metric may be used in combination with data provided by other modules of the mapping platform 200 for providing parking strategy recommendation in accordance with the embodiments disclosed herein.

The mapping platform 200 further includes the turnover data module 205 that may provide data related to turnover metric for a link, such as the on-street parking pathway in vicinity of the user of the vehicle 101. The turnover metric may be calculated on the basis of a churn rate of the link. The churn rate of the link may be defined as an indicator of a rate of movement of vehicles in the link, such as the rate of moving in and out of the parked vehicles in the link. The churn rate may be calculated on the basis of park-in and park-out events occurring at a given location, such as in the link in the vicinity of the vehicle 101. For example, the churn rate may be determined on the basis of an absolute amount of park-in and park-out events reported for a given location in the last few minutes. In some embodiments, the churn rate may be determined on the basis of absolute number of park-in and park-out events at a given location monitored at similar times on similar days. These events may be monitored using sensing technologies, such as probe based sensing, camera feed detection, drones based monitoring and the like and then registered in the mapping platform 200.

In some embodiments, the sensing technologies used for estimating the churn rate may be ultrasonic sensing technologies. For example, for a region of interest, differences in ultrasonic sensor scan measurements between consecutive scans for objects, such as cars parked in the parking spots in the region of interest, may be used to detect if objects have moved between the consecutive scans. The movements in turn may be used to indicate change in the status of availability of a parking spot, which otherwise may be detected as full. The movements are then used to compute the churn rate for the region of interest, which may be the link in the vicinity of the vehicle 101. The computed churn rate may be used to determine the turnover metric, which may be used in combination with the data provided by other modules of the mapping platform to provide parking strategy recommendation in accordance with the embodiments disclosed herein.

The mapping platform 200 may further include the search time data module 207 that may be used to provide an estimate of a time required for searching for a suitable parking spot in the link in vicinity of the vehicle 101. In some embodiments, the search time may be computed on the basis of a time required for navigating through the link. In some embodiments, the time required for navigating through the link may be computed on the basis of speed measurement of the vehicle 101 and the length of the link, wherein the length of the link may be known by road geometry related data stored in the historical data module 201 of the mapping platform 200. The time required for navigating through the link, in combination with the turnover metric and the availability metric may be used to identify the search time required for searching for a suitable parking spot in the link. According to some embodiments, the search time may be computed on the basis of a ratio of the turnover metric and the availability metric and the time required for navigating through the link.

The search time thus computed may further be used to provide a parking strategy recommendation for the vehicle 101.

The computations provided on the mapping platform 200 may be performed by the processing module 211. The processing module 211 may be embodied in a number of different ways. For example, the processing module 211 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing module 211 may include one or more processing cores configured to perform independently. A multi-core processor may enable multiprocessing within a single physical package. Additionally or alternatively, the processing module 211 may include one or more processors configured in tandem via the bus to enable independent execution of instructions, pipelining and/or multithreading. Additionally or alternatively, the processing module 211 may include one or processors capable of processing large volumes of workloads and operations to provide support for big data analysis.

In an example embodiment, the processing module 211 may be configured to execute instructions stored in a memory device or otherwise accessible to the processing module 211. As such, whether configured by hardware or software methods, or by a combination thereof, the processing module 211 may represent an entity (for example, physically embodied in circuitry) capable of performing operations according to an embodiment of the present invention while configured accordingly. Thus, for example, when the processing module 211 is embodied as an ASIC, FPGA or the like, the processor may be specifically configured hardware for conducting the operations described herein. Alternatively, as another example, when the processing module 211 is embodied as an executor of software instructions, the instructions may specifically configure the processing module 211 to perform the algorithms and/or operations described herein when the instructions are executed. However, in some cases, the processing module 211 may be a processor specific device (for example, a mobile terminal or a fixed computing device) configured to employ an embodiment of the present invention by further configuration of the processing module 211 by instructions for performing the algorithms and/or operations described herein. The processing module 211 may include, among other things, a clock, an arithmetic logic unit (ALU) and logic gates configured to support operation of the processing module 211.

In some embodiments, the processing module 211 may be configured to provide Internet-of-Things (IoT) related capabilities to users of the parking recommendation system disclosed herein. The IoT related capabilities may in turn be used to provide smart city solutions by providing real time parking updates, big data analysis, and sensor based data collection by using the cloud based mapping platform 200 for providing navigation and parking recommendation services.

In some embodiments, the mapping platform 200 may be configured to provide an environment for development of parking strategy recommendation solutions for navigation systems in accordance with the embodiments disclosed herein. The environment may be accessed using the user interface module 209 of the mapping platform 200 disclosed herein. The user interface module 209 may provide an interface for accessing various features and data stored in the mapping platform 200.

In some embodiments, the mapping platform 200 may be configured to provide a repository of algorithms for implementing a plurality of location based services for navigation systems. For example, the mapping platform 200 may include algorithms related to geocoding, routing, machine learning in location based solutions, natural language processing algorithms, artificial intelligence algorithms and the like.

The data for different modules of the mapping platform 200 may be collected using a plurality of technologies including but not limited to drones, sensors, connected cars, cameras, probes, chipsets and the like. The collected data may be used to determine different metrics required for providing parking strategy recommendation according to the embodiments disclosed herein.

FIG. 3 illustrates a flow diagram of a method for providing parking strategy related recommendation for a vehicle, such as the vehicle 101, in vicinity of a link, such as the link 107 according to an example embodiment of the present invention. It will be understood that each block of the flow diagram of the method 300 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus, such as the user equipment 103, or the mapping platform 200, employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 300 support combinations of means for performing the specified functions and combinations of operations for performing the specified functions. It will also be understood that one or more blocks of the flow diagram 300, and combinations of blocks in the flow diagram 300, can be implemented by special purpose hardware-based computer systems which perform the specified functions, or combinations of special purpose hardware and computer instructions.

The method 300 illustrated by the flow diagram of FIG. 3 for providing parking strategy related recommendation for a vehicle in vicinity of a link includes, at 301, determining an availability metric for the link. In some embodiments, the availability metric may provide an indication of the availability status of the link. For example, if a link has one parking spot free, the availability metric may provide a value that indicates that the link is available. On the other hand, if all the parking spots on the link are occupied, the availability metric may provide a value that indicates that the link is full. If there are more than one parking spot available on the link, the availability metric may provide a value that is intermediate between the availability metric value for the link to be free and the availability metric value for the link to be available. In some example embodiments, the availability metric may be retrieved from a database, such as the availability data module 203 of the mapping platform 200. In some other example embodiments, the availability metric may be retrieved from a module, such as a memory, available on a device, such as the user equipment 103 installed within the vehicle 101. Once the availability metric has been determined, the availability metric may be used in combination with other metrics for providing a parking strategy related recommendation in accordance with the method 300.

The method 300 may further include, at 303, determining a turnover metric for the link. In some embodiments, the turnover metric may provide an indication of the churn rate of the link as described in the example embodiments discussed previously. The churn rate of the link may be an indicator of the movement of vehicles in the link. The movement of vehicles in the link may be determined based on the number of vehicle park-in and park-out events occurring in the link. In some example embodiments, the park-in and park-out events may be monitored on the basis of one or more sensing technologies including but not limited to, ultrasonic sensing, proximity sensing, drones based monitoring, scanning sensors, camera sensing and the like. In some embodiments, determining the turnover metric may include retrieving a value for the turnover metric from a database, such as the turnover data module 205 of the mapping platform 200. In some other example embodiments, the turnover metric may be retrieved from a module, such as a memory, available on a device, such as the user equipment 103 installed within the vehicle 101. Once the turnover metric has been determined, the turnover metric may be used in combination with other metrics, such as at least the availability metric determined in step 301, for providing a parking strategy related recommendation in accordance with the method 300.

The method 300 may further include, at 305, providing a parking strategy related recommendation based on a function of at least the availability metric and the turnover metric. For example, the method 300 may include calculating a strategy metric based on a function of at least the availability metric and the turnover metric. The calculation may be performed by a processor, such as a processor included in the user equipment 103, or the processing module 211 of the mapping platform 200, described earlier in various embodiments. In some example embodiments, calculating the strategy metric may include calculating a ratio between the availability metric and the turnover metric. In some other example embodiments, calculating the strategy metric may include calculating a ratio between the availability metric and the turnover metric and also calculating a search time, wherein the search time may be the time required for searching for a suitable parking slot in the link. The calculated strategy metric may then be used to provide a parking strategy related recommendation for the vehicle 101. In an example embodiment, the calculated value of the strategy metric may be compared against predetermined threshold values for providing the parking strategy related recommendation in accordance with the steps of the method 300.

The method 300 may further include, at 307, providing data for indicating the identified parking strategy related recommendation to a user interface. The user interface may be associated with the user equipment 103, such as a navigation device installed in the vehicle 101. For example, on the basis of the value of the strategy metric it may be determined that the best strategy for the vehicle may be to stop and wait in the link for an available parking slot to become free. This may happen, such as when the turnover metric and hence the churn rate of the link is high, even though the availability of the link may be low at the time of estimation of the parking strategy. The value of the strategy metric may be higher than a first predetermined threshold in this example. In such a situation the data for providing parking strategy related recommendation may include a text instruction, "stop and wait", which may be displayed on the user interface, such as a display of the navigation device installed in the vehicle 101.

In another example embodiment, the link may have low availability but also low churn rate. In such an example, the calculated strategy metric value may be higher than a second predetermined threshold value. In such a situation the best strategy for parking may be to continue moving forward on the link to identify a favorable parking spot within the same link. In this case, data for providing parking strategy related recommendation may include a text instruction, "continue moving forward", which may be displayed on the user interface, such as a display of the navigation device installed in the vehicle 101.

In another example embodiment, the link may have low availability and also low churn rate. In such an example, the calculated strategy metric value may be higher than a third predetermined threshold value. In such a situation the best strategy for parking may be to explore a second link, such as an adjoining street or a higher floor of parking garage, to identify a favorable parking spot the vehicle 101. In such an example, data for providing parking strategy related recommendation may include a text instruction, "explore other link", which may be displayed on the user interface, such as a display of the navigation device installed in the vehicle 101.

In an example embodiment, the data for providing parking strategy related recommendation may include audio or voice data for providing audio or voice based indication of the parking strategy related recommendation.

In an example embodiment, an apparatus for performing the method 300 of FIG. 3 above may comprise a processor (e.g. the processing module 211) configured to perform some or each of the operations (301-307) described above. The processor may, for example, be configured to perform the operations (301-307) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 301-307 may comprise, for example, the processor 211 and/or a device or a device or circuit for executing instructions or executing an algorithm for processing information as described above. The algorithm may be caused to implement processing operations in accordance with the mathematical model illustrated in FIG. 4. In some embodiments, the mathematical model of FIG. 4 may be a two-state Markov model.

FIG. 4 illustrates a two-state Markov model 400 for a link in accordance with embodiments of the present invention disclosed herein. A Markov model is a stochastic model that may be used to model temporal data. The Markov model is composed of states, transitions, and emission of outputs. The transitions between states may be modeled using probabilistic estimates. The probabilistic estimates may be obtained on the basis of past sequences of transitions between the states of the Markov model. In the Markov model, each future state depends on the present state only and has no dependency on how the state was reached. Thus Markov models may be used to model random data sequences for predicting future outcomes.

According to the model 400 of FIG. 4, each link can be in one of two states, a full state 401, and an available state 403. The link illustrated in FIG. 4 can be any link in any location, area or region of interest, lying at any point on a map corresponding to a map of a region for providing parking space. That is to say, all the links are considered to be similar. However, in some embodiments, the model may be altered to reflect variations of link parameters such as link length, parking capacity of the link, and other link specific parameters.

A link may be in the available state 403, when at least one parking spot in the link is free. If all the parking spots in the link are occupied (by vehicles), the link is considered to be in the full state 401. The links can change state from full to available and from available to full according to a continuous Markov chain of parameters.

The rate of transition of a link from the full state 401 to the available state 403 may be designated as $\lambda$. Further, the rate of transition of the link from the available state 403 to the full state 401 may be designated as $\mu$.

In some embodiments, $\lambda$ may be defined as the churn rate for the link, wherein the churn rate has been discussed previously in the embodiments disclosed herein. In some embodiments, $\lambda$ may be used as the turnover metric that may be used to calculate the strategy metric for providing parking strategy related recommendation according to the methods and systems disclosed herein.

According to the Markov model 400, also interchangeably referred to as Markov chain, 400, an availability metric may be calculated as a probability $p_a$ of the Markov chain 400 to be in the available state 403 as:

$$p_a = \lambda/\lambda + \mu$$

Thus, the Markov chain 400 may be used to determine the availability metric and the turnover metric for calculating the strategy metric for providing parking strategy related recommendation in accordance with the embodiments of the present invention disclosed herein.

In some embodiments, the strategy metric may be calculated based on the ratio of at least the turnover metric $\lambda$ and the availability metric $p_a$.

The ratio of the turnover metric $\lambda$ and the availability metric $p_a$ may also be dependent on a search time parameter. Assuming that navigating through one link takes s seconds, an average search time E[S], that may be the time required for searching for a suitable parking spot on the link may be calculated as:

$$E[S] = (1-pa)(s+E[S])$$

Which may be also be represented as:

$$E[S] = \frac{\mu}{\lambda} s$$

In some embodiments, E[S] may be used as the strategy metric for identifying a strategy for providing parking related recommendation for the vehicle 101. The strategy metric may be compared against one or more predetermined thresholds to identify the suitable strategy for parking.

For example, an average waiting time before a parking spot gets available in a given street may be calculated as $1/\lambda$. The parking strategy recommendation may be provided on the basis of a comparison of the metrics E[S] and $1/\lambda$.

If $1/\lambda < E[S]$
Or
$s > 1/\mu$ then, the parking strategy may be to stop and wait at a spot near the link for a favored parking spot to get free in the link. The value of the strategy metric may be higher than a first predetermined threshold in this case. The parking strategy may be used to provide data for providing an indication on a user interface, such as the display associated with the user equipment 103, to stop and wait at a spot for finding a favored parking place. In some embodiments, the display may also indicate the locations of the best spots to stop and wait for the user of the vehicle 101.

In some embodiments, the best spots may be some designated waiting areas on a street. In some embodiments, the designated waiting areas may be provided on each floor of a parking garage having a plurality of floors. The designated waiting areas may be marked for user notice. According to some embodiments, the designated waiting area may be marked at some extremity of the link.

In some embodiments, the designated waiting areas may be identified on the basis of their proximity to the parking space departure area. The designated waiting areas may be indicated to the user on the user interface of the user equipment 103 so that the user waits in the best spots without disturbing the ongoing traffic and without flouting any traffic regulations. Moreover, the indication of the designated waiting areas can also save the user from conflict situations for a parking slot. For example, when two users are competing for the same parking spot, the user which is nearer to the parking spot is more likely to reach the parking spot first. In that case, the other user may wait in the designated waiting area to avail the next favored parking spot.

In some embodiments, the favored parking spot may be available in relatively lesser crowded street locations that may be indicated by the user equipment 103 on the display.

In some embodiments, the favored parking spot may be available on higher floors of a parking garage, which may be indicated by the user equipment 103 on the display.

In some embodiments, a distance of the final destination of the vehicle 101 may be considered for identifying the favored parking spot based on parking strategy recommendation. In some embodiments, the distance of the final destination of the vehicle 101 may be used in combination with other metrics to identify the strategy for providing parking recommendation.

For example, assuming that exploring a link leads to w more steps of walking for the user. Thus, an average walk time may be computed as:

$$wE[W] = \frac{\mu}{\lambda} w$$

The average walking time may be added to the search time previously calculated to provide the total search time as:

$$\text{Total cost of walking in the link} = \frac{\mu}{\lambda}(s + w)$$

In some embodiments the total cost of walking or continuing in the current link to find a favorable parking space may be against the previously computed strategy metric to identify a parking strategy recommendation. If the churn rate and thus the turnover metric for the link is high and the availability metric is also high, then the comparison between the search time for exploring more links based on the strategy metric and the total cost of walking in the same link may provide an indication that it is better to keep circling around in the same link, that is to say, to continue moving forward in the link to identify a favorable parking space. However, this strategy for parking recommendation may be favorable if the chances of a link transitioning from the full state 401 to the available state 403 between two visits of the user are high. In some other embodiments, the links may be arranged in the form of circular streets. Assuming that the circle contains n streets, the average walk time in this case may be computed as:

$$E[W'] = \frac{n}{2} w.$$

The full circle take ns seconds to travel, thus the probability that a street that was observed full ns seconds ago is now available may be computed as:

$$p'_a = \frac{\lambda}{\lambda + \mu}(1 - e^{-(\lambda+\mu)ns})$$

Thus, the average search time now becomes:

$$E[S'] = \frac{\mu + \lambda e^{-(\lambda+\mu)ns}}{\lambda - \lambda e^{-(\lambda+\mu)ns}} s$$

Thus, the total time spent on searching for the favorable parking space while circling around the same link may be computed as:

$$E[S'] + E[W'] < E[s] + E[W]$$

which may also be stated as:

$$\frac{\mu + \lambda e^{-(\lambda+\mu)ns}}{\lambda - \lambda e^{-(\lambda+\mu)ns}} s + \frac{n}{2} w < \frac{\mu}{\lambda}(s + w).$$

In this scenario the user may be provided the indication to continue moving forward on the link. The value of the strategy metric may be higher than a second predetermined threshold in this case.

However, if this criterion is not met, such as in case when the churn over rate of the link, and hence the turnover metric is lower than the availability metric, the strategy metric previously computed may have value higher than a third predetermined threshold, the user may be indicated to change their route of navigation to a second link and thus explore more places for parking.

In some embodiments, the indication for the strategy may be provided on the user interface, such as the display associated with the user equipment 103 installed in the vehicle 101. The user equipment may be a navigation device, such as a navigation device equipped with advanced driver assistance capabilities for providing navigation assistance to the user of the vehicle 101. In some embodiments, the display of the user equipment 103 may be used to indicate the route for navigating to the suitable parking spot, also referred to as a favored parking spot, based on the identified parking strategy recommendation.

The first predetermined threshold, the second predetermined threshold and the third predetermined thresholds respectively may be identified on the basis of analysis of parking related data aggregated over historical periods of time. The threshold values may be stored in historical data module 201 of the mapping platform and may be used for performing one or more computations for providing parking strategy recommendation in accordance with the embodiments disclosed herein.

The computations may be performed by a processor capable of performing complex computations as, such as the processing module 211 of the mapping platform. The computations of various metrics, the comparisons of various metrics with threshold values and the estimates of search time may be used in varying combinations to provide an indication of a route for navigation to the favored parking space to the user of the vehicle 101 in accordance with the identified strategy for recommendation. The various exemplary scenarios for identifying the different strategies for parking recommendations may be illustrated in the FIGS. 5A-5C.

FIGS. 5A-5C illustrate three exemplary scenarios for providing parking strategy recommendation based on the values of different metrics according to example embodiments of the present invention.

FIG. 5A illustrates an example 501 in which the churn rate of the link 501A is high. Thus, a number of park-in and park-out events may occur, such as vehicles 501B and 501C that are parked in the link may be leaving the link. In this scenario, the availability of the link may be low, but churn rate and thus, the turnover metric is high. Thus, the value of the strategy metric may higher than the first predetermined threshold. Thus, the vehicle 101 may be indicated to stop and wait according to the parking strategy recommendation.

FIG. 5B illustrates an example 503 in which the churn rate of the link 503A is high availability is also high. The parking spots indicated by places 503B and 503C are vacant. Also, there are a number of park-in and park-out events occurring the link 503A. In this scenario, the availability of the link may be moderate, but churn rate and the turnover metric is high. Thus, the value of the strategy metric may higher than the second predetermined threshold. Thus, the vehicle 101 may be indicated to continue moving forward on the link 503A according to the parking strategy recommendation.

FIG. 5C illustrates an example 505 in which the churn rate of the link 505A is high and availability is low. In this scenario, churn rate and the turnover metric is low as there are not many park-in and park-out events occurring in the link 505A. Further, all of the parking spots are occupied, thus availability metric is also low. In this scenario, the value of the strategy metric may be higher than the third predetermined threshold. Thus, the vehicle 101 may be indicated to explore other links, such as the link 505B according to the parking strategy recommendation.

The data for the various metrics may be collected on the basis of different sensing technologies including cameras, drones, ultra-sonic sensors, chipsets, and the like. Two of these exemplary techniques are illustrated in FIGS. 6A-6B.

FIGS. 6A-6B illustrates two exemplary sensing technologies for collecting data for determining turnover metric according to an example embodiment of the present invention.

FIG. 6A illustrates a sensing technology 601 for performing periodic ultrasonic sensor scans between vehicle gaps to identify if any vehicles have moved between successive scans, to identify a value for the turnover metric. The vehicles may be equipped with ultrasonic sensors that may be configured to detect if there are gaps between the adjacently parked vehicles. Presence of gaps may indicate that there are free spots between the vehicles. In some embodiments, the data collected by the ultrasonic sensor scans may be sent to a cloud based database, such as the historical data module 201 of the mapping platform 200 for use in navigation and parking assistance services. In some embodiments, such data may be collected at regular time intervals. In some embodiments, such data may be collected at designated times of day.

FIG. 6B illustrates a sensing technology 603 for monitoring park-in and park-out events in a parking space to identify a value of the turnover metric. The entering and leaving of vehicles from a parking area may be monitored using different sensing technologies such as camera feeds, probe based collection, drones for monitoring these events and the like. In some embodiments, the data related to park-in and park-out events may be collected and transmitted to a cloud based database, such as the historical data module 201 of the mapping platform 200 for use in navigation and parking assistance services. The data may be used in computation of various metrics used in providing parking strategy related recommendations.

The plurality of metrics discussed above may be used to provide data for providing indication related to parking strategy recommendation to the user interface of the vehicle 101. In some embodiments, the indications may be provided on a display associated with the user equipment 103, which may be a navigation device installed in the vehicle 101. The display may have a user interface, which may be a map based graphical interface providing various indications to the user for the identified parking strategy recommendations.

FIGS. 7A-7C illustrate the user interface for providing indication of favored parking spots based on the data for parking strategy recommendation according to example embodiments of the present invention.

FIG. 7A illustrates a map based user interface 701 that may be used to indicate vacant and occupied parking spaces based on variations in depictions of links. For example, the map based user interface 701 illustrates occupies spaces by a different line pattern and vacant spaces by a different line pattern.

FIG. 7B illustrates a map based user interface 703 that may be used to indicate a route to the favored parking space in accordance with the identified strategy for parking. The map based user interface 703 may also provide a text based indication on the display of the map based user interface of the vehicle 101, related to the parking strategy. For example the map based user interface 703 illustrates providing a text display indicating the vehicle 101 to "Stop and Wait" for availing a favorable parking spot. Further, the map based user interface 703 may also provide a display of a distance value, illustrated here as "0.52 miles", indicating a distance of the favorable parking spot, illustrated here by a location icon, from the vehicle's current location, illustrated here by a car icon. The map based user interface 703 may also indicate to indicate vacant and occupied parking spaces based on variations in depictions of links.

FIG. 7C illustrates a map based user interface 705 that may be used to provide a text message to displaying "explore more streets" for identifying a favored parking space according to a parking strategy recommendation. The map based user interface 705 may also provide display of a distance value, illustrated here as "0.52 miles", indicating a distance of the favorable parking spot, illustrated here by a location icon, from the vehicle's current location, illustrated here by a car icon. The map based user interface 705 may also indicate to indicate vacant and occupied parking spaces based on variations in depictions of links.

In some embodiments, the indication for the favored parking spot may be provided based on an audio or voice based interaction between the user interfaces 701-705 and the user of the vehicle 101. For example, the user may provide a voice based query for asking for a parking strategy recommendation. The user may say "What should I do now, stop here or continue driving around?" In return, the user interface, 701-705, may provide an output based on the identified strategy for parking. For example, if the recommended strategy for parking is to stop and wait, the user interface 703 may provide a voice response indicating "Waiting at the current location would be a good option." However, if the recommended strategy for parking is to explore more streets, the user interface 705 may provide a voice response indicating "Waiting at street X is a better option". Further, if the recommended strategy for parking is to continue driving in the current link, the user interface 701 may provide a voice response indicating "Driving the indicated path may increase your chances of finding a parking spot".

In some embodiments, the user interface, 701-705, may provide audio commands for guiding the user to navigate to the favored parking spot based on the identified parking strategy related recommendation.

Embodiments disclosed herein may provide parking strategy related recommendations to users of a vehicle, such as the drivers looking for suitable parking spaces in an on-street parking area based on real-time parking and vehicle data. The parking strategy is provided on the basis of advanced analysis, such as big data analysis, performed on real-time vehicle data and also historical data used to derive one or more metrics related to vehicle movements in a parking region of interest. As a result, the parking strategy can be used for recommending an optimal, efficient, time saving and accurate parking space to the driver looking for parking space. This in turn helps in reducing the time to park the vehicle, leading to lesser vehicle miles being spent on finding parking space, and also lesser traffic snarls and pollution.

The parking strategy disclosed in the methods and systems of the embodiments disclosed herein is based on a plurality of quantitative metrics associated with parking space, vehicle movements in and out of the parking space, distance of travel required for finding a suitable parking spot in a parking area and time required for searching for the suitable parking spot. These quantitative metrics can be used in one or more combinations as suggested herein, to derive the most optimal parking strategy for a user in a given location.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for providing parking related recommendation for a vehicle in vicinity of a link, the method comprising:
   determining an availability metric for the link;
   determining a turnover metric of vehicles in the link;
   calculating, by a processor, a strategy metric based on a function of at least the availability metric and the turnover metric, for identifying a strategy for providing a parking related recommendation; and
   providing data to a user interface for indicating the identified strategy that includes: stop and wait if a value of the strategy metric is higher than a first predetermined threshold value, continue moving forward on the link if the value of the strategy metric is higher than a second predetermined threshold value; or change a route of navigation to a second link if the value of the strategy metric is higher than a third predetermined threshold value, wherein the predetermined thresholds correspond to different values of the strategic metric.

2. The method of claim 1 further comprising providing route navigation assistance for the vehicle to navigate to a favored parking spot based on the identified strategy for parking.

3. The method of claim 1, wherein the function of at least the availability metric and the turnover metric is a ratio function.

4. The method of claim 3, further comprising:
   determining a time required for navigating through the link; and
   calculating, by the processor, a time required for searching for a suitable parking spot based on a ratio between the availability metric, the turnover metric, and the time required for navigating through the link,
   wherein the strategy is identified based on the time required for searching for a suitable parking spot.

5. The method of claim 1, wherein determining the turnover metric comprises retrieving data for the turnover metric from a mapping platform, wherein the turnover metric is identified on the basis of park-in and park-out events for a given location, registered in the mapping platform.

6. The method of claim 1, wherein determining the availability metric comprises retrieving availability status of a parking location of interest from a mapping platform.

7. An apparatus comprising at least one processor and at least one non-transitory memory including computer program code instructions, the computer program code instructions configured to, when executed, cause the apparatus to at least:
   determine an availability metric for a link;
   determine a turnover metric of vehicles in the link;
   identify a strategy for parking based on a strategy metric, wherein the strategy metric is based on a function of at least the availability metric and the turnover metric, for providing a parking related recommendation; and
   provide data to a user interface for indicating the identified strategy that includes: stop and wait if a value of the strategy metric is higher than a first predetermined threshold value, continue moving forward on the link if the value of the strategy metric is higher than a second predetermined threshold value; or change a route of navigation to a second link if the value of the strategy metric is higher than a third predetermined threshold value, wherein the predetermined thresholds correspond to different values of the strategic metric.

8. The apparatus of claim 7, wherein the data for indicating the identified strategy for parking comprises:
   data for indicating at least one favorable parking spot on the link; and
   data for indicating a route for navigating to the at least one favorable parking spot on the link.

9. The apparatus of claim 7, wherein the apparatus is further caused to:
   calculate, by the at least one processor, a ratio between the availability metric and the turnover metric;
   determine a time required for navigating through the link; and
   calculate, by the at least one processor, a time required for searching for a suitable parking spot based on a ratio between the availability metric, the turnover metric, and the time required for navigating through the link,
   wherein the strategy is identified based on the time required for searching for the suitable parking spot.

10. The apparatus of claim 9 further caused to identify a distance of the suitable parking spot from a final destination of the vehicle.

11. The apparatus of claim 7, wherein determining the turnover metric causes the apparatus to be further caused to retrieve data for the turnover metric from a mapping platform, wherein the turnover metric is identified on the basis of park-in and park-out events for a given location, registered in the mapping platform.

12. The apparatus of claim 7, wherein determining the availability metric causes the system to be further caused to retrieve the availability status of a parking location of interest from a mapping platform.

13. A computer program product comprising at least one non-transitory computer-readable storage medium having computer-executable program code instructions stored therein, the computer-executable program code instructions comprising program code instructions to:
   determine an availability metric for a link;
   determine a turnover metric of vehicles in the link;
   identify a strategy for parking based on a strategy metric, wherein the strategy metric is based on a function of at least the availability metric and the turnover metric, for providing a parking related recommendation; and
   provide data to a user interface for indicating the identified strategy that includes: stop and wait if a value of the strategy metric is higher than a first predetermined threshold value, continue moving forward on the link if the value of the strategy metric is higher than a second predetermined threshold value; or change a route of navigation to a second link if the value of the strategy metric is higher than a third predetermined threshold value, wherein the predetermined thresholds correspond to different values of the strategic metric.

14. The computer program product of claim 13 further comprising code instructions to display a route for navigation based on the identified strategy for parking.

15. The computer program product of claim 13 further comprising code instructions to provide route navigation assistance for the vehicle to navigate to a favored parking spot based on the identified strategy for parking.

16. The computer program product of claim 13, wherein the function of at least the availability metric and the turnover metric is a ratio function.

17. The computer program product of claim 16 further comprising code instructions to:
   determine a time required for navigating through the link; and
   calculate, by the at least one processor, a time required for searching for a suitable parking spot based on a ratio between the availability metric, the turnover metric, and the time required for navigating through the link,
   wherein the strategy is identified based on the time required for searching for the suitable parking spot.

18. The computer program product of claim 13 further comprising code instructions to retrieve data for the turnover metric from a mapping platform, wherein the turnover metric is identified on the basis of park-in and park-out events for a given location, registered in the mapping platform.

19. The computer program product of claim 13 further comprising code instructions to retrieve availability status of a parking location of interest from a mapping platform to determine the availability metric.

20. The method of claim 1, wherein the predetermined thresholds correspond to increasing values of the strategic metric.

* * * * *